(12) United States Patent
Lee et al.

(10) Patent No.: US 11,067,786 B2
(45) Date of Patent: Jul. 20, 2021

(54) ARTIFACT REGULATION METHODS IN DEEP MODEL TRAINING FOR IMAGE TRANSFORMATION

(71) Applicant: Leica Microsystems Inc., Buffalo Grove, IL (US)

(72) Inventors: Shih-Jong James Lee, Bellevue, WA (US); Hideki Sasaki, Bellevue, WA (US)

(73) Assignee: Leica Microsystems Inc., Buffalo Grove, IL (US)

( * ) Notice: Subject to any disclaimer, the term of this patent is extended or adjusted under 35 U.S.C. 154(b) by 0 days.

(21) Appl. No.: 16/435,430

(22) Filed: Jun. 7, 2019

(65) Prior Publication Data

US 2020/0386978 A1 Dec. 10, 2020

(51) Int. Cl.
*G06N 3/02* (2006.01)
*G02B 21/36* (2006.01)
*G06T 5/00* (2006.01)
*G06N 3/08* (2006.01)
*G06N 20/00* (2019.01)

(52) U.S. Cl.
CPC ............. *G02B 21/365* (2013.01); *G06N 3/08* (2013.01); *G06N 20/00* (2019.01); *G06T 5/001* (2013.01); *G06T 2207/10056* (2013.01); *G06T 2207/20081* (2013.01)

(58) Field of Classification Search
CPC .......... G06N 3/02; G06N 20/20; G06N 3/084; G06N 3/08
See application file for complete search history.

(56) References Cited

U.S. PATENT DOCUMENTS

| 10,169,852 | B1* | 1/2019 | Putman | G06T 5/50 |
| 2005/0089243 | A1* | 4/2005 | Ludwig | G06T 5/10 |
| | | | | 382/280 |
| 2010/0202681 | A1* | 8/2010 | Ai | G06K 9/6257 |
| | | | | 382/159 |
| 2015/0131888 | A1* | 5/2015 | Caprioli | G06K 9/6211 |
| | | | | 382/133 |
| 2017/0337682 | A1* | 11/2017 | Liao | G06T 7/30 |
| 2018/0232601 | A1* | 8/2018 | Feng | G06K 9/4628 |
| 2018/0268220 | A1* | 9/2018 | Lee | G06K 9/627 |
| 2018/0285694 | A1* | 10/2018 | Kobayashi | G06F 15/76 |

(Continued)

*Primary Examiner* — Cindy Trandai
(74) *Attorney, Agent, or Firm* — 2SPL Patent Attorneys PartG mbB; Yong Beorn Hwang

(57) ABSTRACT

A computerized method of artifact regulation in deep model training for image transformation first performs one cycle of deep model training by computing means using a training data, a validation data, a similarity loss function, an artifact regulation loss function and a weight of loss functions to generate similarity loss and artifact regulation loss and a deep model. The method then performs a training evaluation using the similarity loss and the artifact regulation loss thus obtained to generate a training readiness output. Then, depending upon the training readiness output, the method may be terminated if certain termination criteria are met, or may perform another cycle of deep model training and training evaluation, with or without updating the weight, until the termination criteria are met. Alternatively, the deep model training in the method may be a deep adversarial model training or a bi-directional deep adversarial training.

21 Claims, 3 Drawing Sheets

(56) References Cited

U.S. PATENT DOCUMENTS

| | | | |
|---|---|---|---|
| 2019/0035113 A1* | 1/2019 | Salvi | G06N 3/08 |
| 2019/0038148 A1* | 2/2019 | Valys | A61B 5/02416 |
| 2019/0198156 A1* | 6/2019 | Madani | G16H 50/70 |
| 2019/0266701 A1* | 8/2019 | Isikdogan | G06K 9/03 |
| 2019/0286153 A1* | 9/2019 | Rankawat | G06T 7/11 |
| 2019/0347522 A1* | 11/2019 | Nir | G06K 9/6256 |
| 2019/0362522 A1* | 11/2019 | Han | G01R 33/5608 |
| 2020/0050923 A1* | 2/2020 | Patney | G06N 3/0454 |
| 2020/0065940 A1* | 2/2020 | Tang | G06T 3/40 |
| 2020/0085382 A1* | 3/2020 | Taerum | G06N 3/0454 |
| 2020/0104200 A1* | 4/2020 | Kocberber | G06F 17/18 |
| 2020/0126192 A1* | 4/2020 | Munkberg | G06N 3/08 |
| 2020/0155870 A1* | 5/2020 | Takahashi | A61N 5/1067 |
| 2020/0175265 A1* | 6/2020 | Schon | G06F 3/017 |
| 2020/0196024 A1* | 6/2020 | Hwang | G06N 3/0454 |
| 2020/0265273 A1* | 8/2020 | Wei | G06N 3/0481 |
| 2020/0265318 A1* | 8/2020 | Malkiel | G06N 3/0454 |
| 2020/0272823 A1* | 8/2020 | Liu | G06K 9/00711 |

* cited by examiner

ARTIFACT REGULATION METHODS IN DEEP MODEL TRAINING FOR IMAGE TRANSFORMATION

STATEMENT AS TO RIGHTS TO INVENTIONS MADE UNDER FEDERALLY SPONSORED RESEARCH AND DEVELOPMENT

This work was supported by U.S. Government grant number 5R44NS097094-03, awarded by the NATIONAL INSTITUTE OF NEUROLOGICAL DISORDERS AND STROKE. The U.S. Government may have certain rights in the invention.

BACKGROUND OF THE INVENTION

Field of the Invention

The present invention relates to deep model learning and training. More particularly, the present invention relates to computerized methods of artifact regulation in deep model learning for image transformation.

Description of the Related Art a. Description of Problem That Motivated Invention Many problems in image generation, image processing and computer vision require the transformation of an input image into an output image. The image transformation can be considered as transforming one possible representation of a scene into another. A scene may be represented as an RGB image, a gradient field, an edge map, a semantic label map, etc.

In the microscopy imaging fields, despite the rapid advancements in optics, lasers, probes, cameras and novel techniques, major factors such as spatial and temporal resolution, light exposure, signal-to-noise, depth of light penetration and probe spectra continue to limit the types of experiments that are possible. Experimentalists routinely need to trade off these factors. Many biological experiments cannot be performed as they would require very high temporal and spatial resolution which typically is only possible by exposing the sample to damaging amounts of light/energy causing photobleaching and/or phototoxicity. Also, the number of indicators that can be simultaneously observed within a sample is limited by probe spectral bleed-through.

b. How Did Prior Art Solve Problem?

Deep Learning (DL) is a type of Artificial Intelligence (AI) which has recently seen a rise in popular interest. This sudden boost has been fueled primarily by the invention of Convolutional Neural Networks (CNNs), a novel machine learning algorithmic architecture as well as the availability of powerful and relatively cheap computing units. In the early 2010's CNNs became increasingly prominent as tools for image classification, showing superhuman accuracy at identifying objects in images. Since then, DL has expanded to many research fields, showing its potential to outsmart humans in board games such as Go, achieve self-driving cars and to significantly improve biomedical image analysis and diagnosis.

CNNs have been shown to be particularly well suited for image-based problems. Recently, a growing amount of biology studies have used CNNs to analyze microscopy data, laying the foundation for a fundamental change in how microscopy is performed and how imaging data is interpreted. The areas where AI has been applied include: image restoration, such as denoising and resolution enhancement, extraction of structures from label-free microscopy imaging, i.e. virtual staining and automated, accurate classification and segmentation of microscopy images.

However, these new methods have not been widely translated to new imaging applications, such as in the microscopy experiments. They are mostly used by a small number of pioneering research groups who are also engaged in methodology development. The delay between methodology developments and their adoption is due to several practical hurdles and challenges. While performance, versatility, and speed of CNNs are likely to continue improving, several challenges remain. A frequently raised concern in the computer vision, image pattern recognition and microscopy community over AI is how much machine outputs can be trusted to truly represent data. This is a real concern since CNNs have been observed to cause image hallucinations or to fail catastrophically as a result of minute changes in the image. There is the danger of inferring unsubstantiated image details. There are anecdotal examples where networks have 'cheated' their way to high performance, e.g. by using nonsense features such as empty space to identify dead cells or by identifying patterns in the ordering of the data, not in the images themselves. In order to accelerate the adoption of DL in image transformation and microscopy, a method that will control and regulate image artifacts to generate trustworthy results are needed.

BRIEF SUMMARY OF THE INVENTION a. Objectives/Advantages of the Invention

The primary objective of the invention is to provide an artifact regulation method in deep model training for image transformation. The secondary objective of the invention is to provide an artifact regulation loss that can be monitored during deep model training. The third objective of the invention is to provide trustworthy image results to accelerate the adoption of DL in image transformation. The fourth objective of the invention is to provide next generation method for microscopy image restoration. The fifth objective of the invention is to provide next generation method for microscopy image prediction.

b. How Does This Invention Solve the Problem?

In the current invention, the loss function contains a combination of a similarity loss function and an artifact regulation loss function weighted by a weighting factor $\lambda$. The weighting factor can be dynamically updated during the training cycles. The weight update balances the relative importance of the similarity loss and artifact regulation loss. The control of the artifact regulation loss will assure the creation of trustworthy new deep models for image transformation without undesired image artifacts.

DETAILED DESCRIPTION OF THE PREFERRED EMBODIMENTS

The concepts and the preferred embodiments of the present invention will be described in detail in the following in conjunction with the accompanying drawings.

Figure 1:
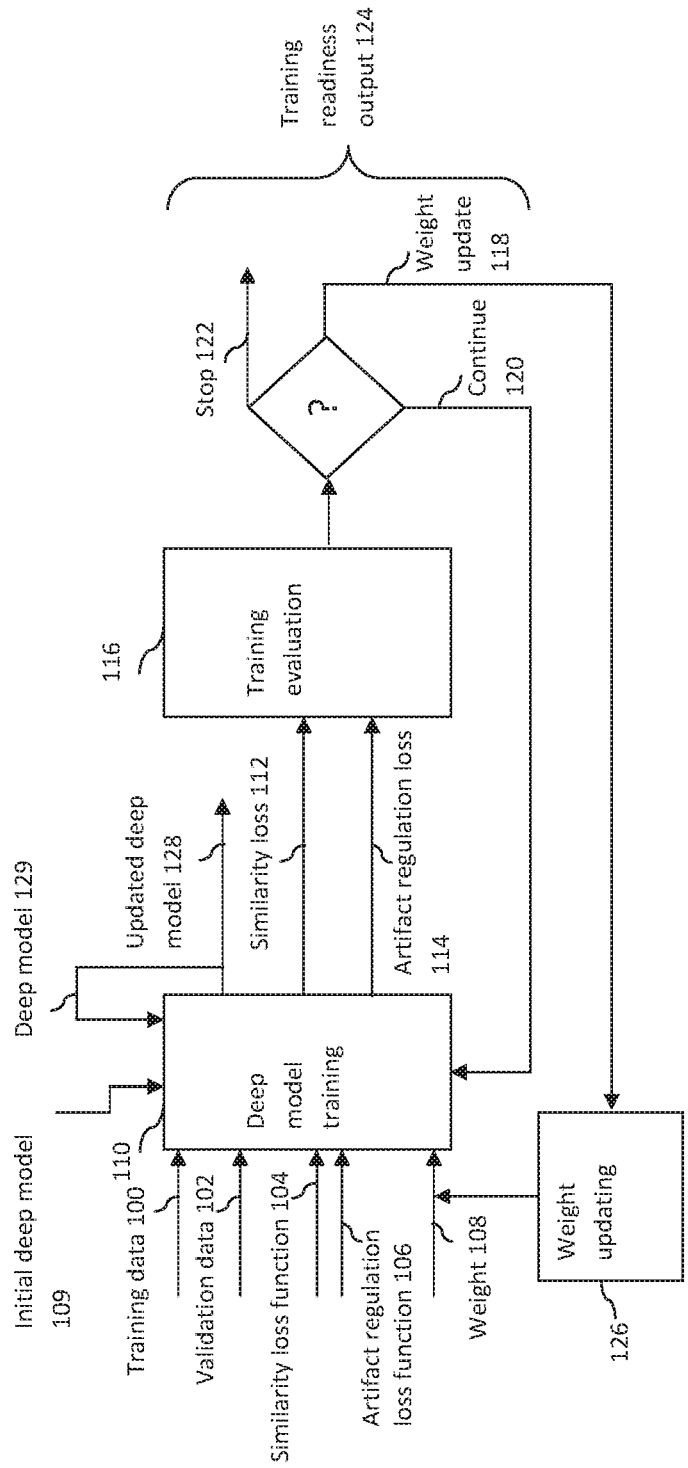
FIG. 1 shows the processing flow of the artifact regulation methods in deep model training for image transformation according to the present invention.

FIG. 1 shows the processing flow of the computerized method of artifact regulation in deep model training for image transformation of the current invention. The training data 100, validation data 102, similarity loss function 104, artifact regulation loss function 106 and the weight of loss functions 108 as well as an initial deep model 109 are entered into electronic storage means such as computer memories. One cycle of the deep model training 110 is performed by computing means to update the deep model 129 using training data 100, validation data 102, similarity loss function 104, artifact regulation loss function 106 and the weight 108 to generate similarity loss 112 and artifact regulation loss 114 for the training cycle and generate an updated deep model 128 that is trained up to the current cycle. The initial deep model 109 is used as the deep model for the first training cycle. Subsequently, the updated deep model 128 generated from the current cycle will be used as the deep model 129 for the next cycle. In other words, the deep model 129 is the starting deep model for the current training cycle and the updated deep model 128 is the starting deep model for the next training cycle. The computing means include central processing unit (CPU), graphics processing unit (GPU), digital signal processor (DSP) from local and/or cloud platforms and/or mobile devices.

The training evaluation 116 is performed using the similarity loss 112 and the artifact regulation loss 114 to generate a training readiness output 124. There are three possible outputs: (1) weight update 118, (2) continue 120 or (3) stop 122. If the training readiness output 124 is weight update 118, a weight updating 126 is performed to update the weight 108 and perform the next deep model training 110 cycle. If the training readiness output 124 is continue 120, the next deep model training 110 cycle will be performed without updating the weight 118. Otherwise, if the training readiness output 124 is stop 122, the training process is terminated and the trained deep model 128 is the output of the deep model training 110.

The individual components and/or steps will be further explained in the following.

1. Training and Validation Data

In one embodiment of the invention, the data is divided into training and validation data. The data contains images and their ground truth (GT) images. The GT can be paired (matching the image) or unpaired. The training data is used to train the deep model 128. The validation data is used to evaluate the deep model training status and readiness. In the microscopy image application of the embodiment, the data may include not only images but also metadata such as microscope types, objective lens, excitation light source, intensity, excitation and dichroic filters, emission filters (for florescence microscopy), detector gain and offset, pinhole size, sampling speed/exposure time, pixel dimensions (size, time point, focus position), etc. In addition, the specimen types and conditions such as live, fixed, organelle types, etc. can also be stored as metadata.

The application target of the current invention includes SNR (signal to noise ratio) restoration, super-resolution restoration, spatial deconvolution, spectral unmixing, virtual staining, etc. Those skilled in the art should recognize that other image transformation, prediction and translation applications could be covered as application targets of the current invention. In addition, GT for the application target can be paired (matching the representative image) or unpaired.

2. Deep Model Architecture

The current invention is applicable to a broad range of deep models containing multiple layers of artificial neural networks such as Convolutional deep Neural Networks (CNNs), Recurrent Neural Networks (RNNs), Generative Adversarial Networks (GANs) and their variants such as Unet, UNet with residual blocks (ResUNet), deep Residual Channel Attention Networks (RCAN), UNet with densely-connected blocks (DenseUNet), Conditional Adversarial Networks (CAN), Bidirectional LSTM, Ensemble DNN/CNN/RNN, Hierarchical Convolutional Deep Maxout Network, etc.

Figure 2:
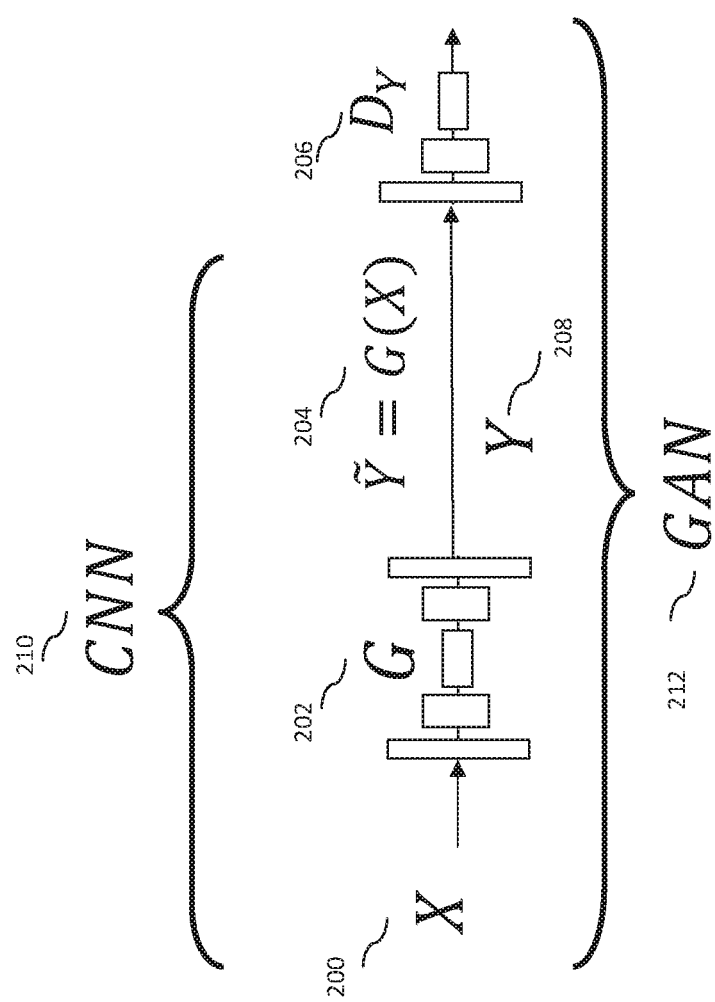
FIG. 2 shows the processing flow of the CNN and GAN embodiments of the deep model architecture according to the present invention.

FIG. 2 shows the processing flow of the CNN and GAN embodiments of the deep model architecture according to the present invention. The CNN 210 consists of a mapping function G 202 from input image domain X 200 to output image domain Y 208. That is G: X→Y resulting in $\tilde{Y}=G(X)$ 204. An embodiment of the CNN image mapping function is U-Net. Those skilled in the art should recognize that any CNN based architectures such as ResUNet, RCAN, DenseUNet can be used as the mapping function G 202 and are within the scope of the current invention.

In addition to the CNN, the GAN 212 can be used. A GNN uses CNN as its generator and has an additional discriminator $D_Y$ 206. In one embodiment of the invention, a convolutional "PatchGAN" classifier is used as the discriminator as PatchGAN only penalizes structure at the scale of image. GAN 212 learns a discriminator that tries to classify if the output image is real or fake, while simultaneously trains a generative model (generator) to minimize the overall loss. The loss function is a weighted combination of the similarity loss function 104 and the artifact regulation loss function 106 with a dynamically adjustable weight 108.

Figure 3:
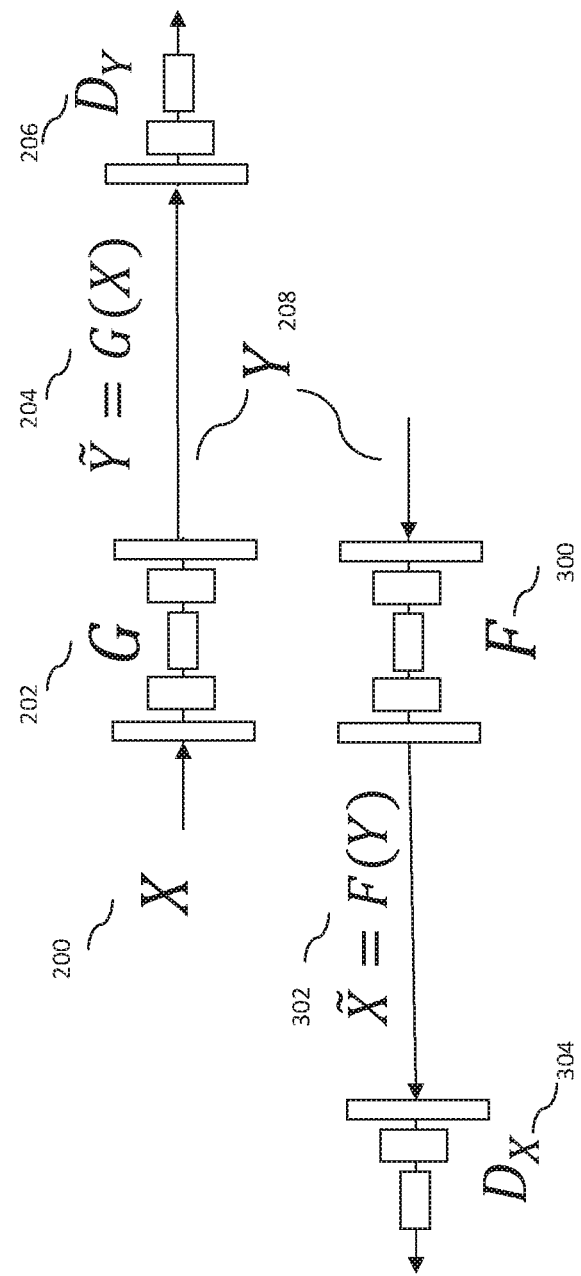
FIG. 3 shows the processing flow of the bi-directional GAN embodiments of the deep model architecture according to the present invention.

In another embodiment of the invention, as shown in FIG. 3, each deep model M consists of a set of two generators G 202 and F 300, and two discriminators $D_Y$ 206 and $D_X$ 304, called bi-directional GAN. That is, M=(G, F, $D_X$, $D_Y$). As described previously, The generator G 202 is a mapping function from the input image domain X 200 to the output image domain Y 208. That is G: X→Y resulting in $\tilde{Y}=G(X)$ 204. F 300 is an inverse mapping function. That is F: Y→X resulting in $\tilde{X}=F(Y)$ 302. The two adversarial discriminators $D_Y$ 206 and $D_X$ 304 classify the mapped images $\tilde{Y}=G(X)$ 204 and $\tilde{X}=F(Y)$ 302 as real or fake.

The bi-directional GAN architecture simultaneously trains the mapping function G 202 and the inverse mapping function F 300. In addition, two adversarial discriminators $D_Y$ 206 and $D_X$ 304 are trained. $D_Y$ 206 aims to discriminate between images {y} in Y domain 208 and mapped images {G(x)}; in the same way, $D_X$ 304 aims to distinguish between images {x} in X domain 200 and inverse mapped images {F(y)};

3. Loss Functions and Deep Model Training

In the current embodiment of the invention, the loss function $\mathcal{L}(X,Y)$ is a combination of the similarity loss function $\mathcal{L}_{sim}(X,Y)$ and the artifact regulation loss function $\mathcal{L}_{AR}(X,Y)$ weighted by a weighting factor λ:

$$\mathcal{L}(X,Y) = \mathcal{L}_{sim}(X,Y) + \lambda \mathcal{L}_{AR}(X,Y)$$

A. CNN

In the CNN architecture embodiment, the deep model training aims to solve $$G^* = \arg\min_G \mathcal{L}(G, X, Y).$$

B. GAN

In the GAN architecture embodiment, the deep model training aims to solve $$G^*, D_Y^* = \arg\min_G \max_{D_Y} \mathcal{L}(G, D_Y, X, Y).$$

In an alternative embodiment for training stability, a pre-trained and fixed discriminators $D'_Y$ is used and the optimization is limited to determining the generator $G^*$. That is, $$G^* = \arg\min_G \mathcal{L}(G, D'_Y, X, Y).$$

C. Bi-Directional GAN

In the bi-directional GAN architecture embodiment, the deep model training aims to solve $$G^*, F^*, D_Y^*, D_X^* = \arg\min_{G,F} \max_{D_Y, D_X} \mathcal{L}(G, F, D_X, D_Y, X, Y).$$

In alternative embodiments for training stability, pre-trained and fixed discriminators $D'_Y$ and/or $D'_X$ are used and the optimization is limited to determining the generators $G^*$, $F^*$ and one or none of the discriminators.

4. Similarity Loss Function

The similarity loss function evaluates the likelihood between the deep model outputs and the expected outputs.

A. CNN and GAN

In the CNN and GAN architecture embodiments, the similarity loss function can be defined as $$\mathcal{L}_{sim}(G,X,Y) = \mathbb{E}_{(x,y) \sim Pdata(x,y)}[\|G(x) - y\|_1]$$

Where $\mathbb{E}$ is the expected value of a function. That is, $$\mathbb{E}_{z \sim Pdata(z)}[h(z)] = \int Pdata(z)h(z)dz$$

Pdata(z) is the probability distribution of the data z. Note that the $L_1$ loss (absolute error) is used because the $L_1$ loss generally generates less blurred images. Those skilled in the art should recognize that the $L_2$ (squared error) or other norms such as $L_p$, $L_\infty$, etc. can be used that are optimal for different applications B. Bi-Directional GAN In the bi-directional GAN architecture embodiment, the similarity loss function can be defined as bi-directional consistency losses $$\mathcal{L}_{sim}(G,F,X,Y) = \mathbb{E}_{x \sim Pdata(x)}[\|F(G(x)) - x\|_1] + \mathbb{E}_{y \sim Pdata(y)}[\|G(F(y)) - y\|_1]$$

or a combination of bi-directional consistency losses and output similarity:

$$\mathcal{L}_{sim}(G, F, X, Y) = \mathbb{E}_{x \sim Pdata(x)}[\|F(G(x)) - x\|_1] +$$
$$\mathbb{E}_{y \sim Pdata(y)}[\|G(F(y)) - y\|_1] + \mathbb{E}_{(x,y) \sim Pdata(x,y)}[\|G(x) - y\|_1]$$

The bi-directional consistency losses prevent the learned mappings G 202 and F 300 from contradicting each other.

5. Artifact Regulation Loss Function

The artifact regulation loss function evaluates the likelihood of deep model output as artifact.

A. CNN

In the CNN architecture embodiment, image content characterization measurements such as histogram, morphology, contrast, structure and context are measured on the data set Y. Then, an image content model is generated using the measurements. In one embodiment, the model is generated using a support vector machine. In the other embodiment, the model is generated using a random forest. Those skilled in the art should recognize that other pattern recognition models can be used for the modeling. Based on the model, an outlier classifier can be created that outputs an outlier confidence value for an input sample. The outlier classifier is used as the artifact regulation loss function.

B. GAN

In the GAN architecture embodiment, the artifact regulation loss function can be defined as the adversarial loss function $$\mathcal{L}_{AR}(G,D_Y,X,Y) = \mathbb{E}_{y \sim Pdata(y)}[\log D_Y(y)] + \mathbb{E}_{x \sim Pdata(x)}[\log(1 - D_Y(G(x)))];$$

The adversarial loss matches the distribution of generated images $\{G(x)\}$ to the image distribution in the target domain $\{y\}$. That is, it evaluates how "realistic" an image created by the generator is.

C. Bi-Directional GAN

In the bi-directional GAN architecture embodiment, the artifact regulation loss function can be defined as the combination of the two adversarial loss functions:

$$\mathcal{L}_{AR}(G,F,D_Y,D_X,X,Y) = \mathcal{L}_{AV}(G,D_Y,X,Y) + \mathcal{L}_{AV}(F,D_X,Y,X).$$

where $$\mathcal{L}_{AV}(G,D_Y,X,Y) = \mathbb{E}_{y \sim Pdata(y)}[\log D_Y(y)] + \mathbb{E}_{x \sim Pdata(x)}[\log(1 - D_Y(G(x)))];$$

$$\mathcal{L}_{AV}(F,D_X,Y,X) = \mathbb{E}_{x \sim Pdata(x)}[\log D_X(x)] + \mathbb{E}_{y \sim Pdata(y)}[\log(1 - D_X(F(y)))]$$

The two adversarial losses $\mathcal{L}_{AV}$ match the distributions of generated images $\{G(x)\}$, $\{F(y)\}$ to the image distributions in the target domains $\{y\}$ and $\{x\}$.

6. Training Evaluation and Training Readiness Output

It is well known that too little training means that the trained deep model 128 will underfit the training data 100 and the validation data 102, whereas too much training means that the trained deep model 128 will overfit the training data 100. In this case, the model will stop generalizing and start learning the statistical noise in the training data 100. A common approach is to train on the training data 100 but to stop training cycles at the point when performance on the validation data 102 starts to degrade. This is a simple, effective, and widely used approach to training deep models.

A. Stop decision

During the deep model training 110 cycles, the deep model 128 is evaluated on the validation data 102 after each cycle. If the performance of the model on the validation data 102 starts to degrade in terms of the increase of the loss value, then the training process is stopped. The loss value for the evaluation is the weighted similarity loss 112 and artifact regulation loss 114 using the weight 106. To assure that the training is not stopped pre-maturely, a minimum training cycle count is set and the training will continue if the count is not reached. On the contrary, to avoid undetected overfitting and/or wasted computing time, a maximum training cycle limit is set. The training will stop if the limit is exceeded. Note that to reduce the additional computational cost for evaluation during training. The training cycle can be defined as multiple training epochs such as every 2, 5, 10 training, etc.

B. Weight Update Decision

The current invention minimizes image artifact by the additional monitoring of the similarity loss 112 and artifact regulation loss 114 separately based on the loss function results of the training data 100 and the validation data 102. In one embodiment of the invention, a ratio of the artifact regulation loss 114 and the similarity loss 112 is monitored. If the ratio exceeds a high threshold, the weight $\lambda$ will be increased. If the ratio is below a low threshold, the weight $\lambda$ will be decreased. The amount by which the weight $\lambda$ is increased or decreased can be proportional to the deviations to the thresholds or by other pre-defined rules. The weight update balances the relative importance of the similarity loss and artifact regulation loss. The control of the artifact regulation loss will assure the creation of trustworthy new deep models for image transformation without undesired image artifacts. After weight updating, the training cycle will continue.

C. Continue Decision

If stop condition is not met and no weight update is necessary, the training process will simply continue to the next cycle.

One of the stop 122, weight update 118 or continue 120 will be the training readiness output 124 of the current deep model training 110 cycle.

The invention has been described herein in considerable detail in order to comply with the Patent Statutes and Rules and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention.

What is claimed is:

1. A computerized method of artifact regulation in deep model training for image transformation, the method comprising the steps of:
   a) inputting a training data, a validation data, a similarity loss function, an artifact regulation loss function and a weight of loss functions and an initial deep model into electronic storage means; and setting a deep model to the initial deep model;
   b) performing one cycle of deep model training by computing means to update the deep model using the training data, the validation data, the similarity loss function, the artifact regulation loss function and the weight to generate similarity loss and artifact regulation loss and an updated deep model;
   c) performing a training evaluation using the similarity loss and the artifact regulation loss from step b) to generate a training readiness output selected from a group consisting of (1) weight update, (2) continue and (3) stop;
   d) in response to the training readiness output from step c) being weight update, performing a weight updating to update the weight, setting the deep model to the updated deep model and repeating steps b) through c);
   e) in response to the training readiness output from step c) being continue, setting the deep model to the updated deep model and repeating steps b) through c); and
   f) in response to the training readiness output from step c) being stop, terminating the method and outputting the updated deep model generated in step b).

2. The computerized method of artifact regulation of claim 1, wherein the similarity loss function evaluates likelihood between deep model output and expected output.

3. The computerized method of artifact regulation of claim 1, wherein the artifact regulation loss function evaluates likelihood of deep model output as artifact.

4. The computerized method of artifact regulation of claim 1, wherein the training evaluation uses trends of the similarity loss and the artifact regulation loss of the training data and the validation data to generate the training readiness output.

5. The computerized method of artifact regulation of claim 1, wherein the weight updating balances the similarity loss and the artifact regulation loss by monitoring their ratio.

6. The computerized method of artifact regulation of claim 1, wherein the electronic storage means is in a cloud platform.

7. The computerized method of artifact regulation of claim 1, wherein the computing means is in a cloud platform.

8. The computerized method of artifact regulation in deep model training for image transformation of claim 1, wherein the image transformation is for microscopy image restoration.

9. The computerized method of artifact regulation in deep model training for image transformation of claim 1, wherein the image transformation is for microscopy image prediction.

10. A computerized method of artifact regulation in deep adversarial model training for image transformation, the method comprising the steps of:
    a) inputting a training data, a validation data, a similarity loss function, an artifact regulation loss function and a weight of loss functions and an initial deep model into electronic storage means; and setting a deep model to the initial deep model;
    b) performing one cycle of deep adversarial model training by computing means to update the deep model using the training data, the validation data, the similarity loss function, the artifact regulation loss function and the weight to generate similarity loss and artifact regulation loss and an updated deep model;
    c) performing a training evaluation using the similarity loss and the artifact regulation loss from step b) to generate a training readiness output selected from a group consisting of (1) weight update, (2) continue and (3) stop;
    d) in response to the training readiness output from step c) being weight update, performing a weight updating to update the weight, setting the deep model to the updated deep model and repeating steps b) through c);
    e) in response to the training readiness output from step c) being continue, setting the deep model to the updated deep model and repeating steps b) through c); and
    f) in response to the training readiness output from step c) being stop, terminating the method and outputting the updated deep model generated in step b).

11. The computerized method of artifact regulation of claim 10, wherein the similarity loss function evaluates likelihood between deep adversarial model output and expected output.

12. The computerized method of artifact regulation of claim 10, wherein the artifact regulation loss function evaluates adversarial losses.

13. The computerized method of artifact regulation of claim 10, wherein the training evaluation uses trends of the similarity loss and the artifact regulation loss of the training data and the validation data to generate the training readiness output.

14. The computerized method of artifact regulation of claim 10, wherein the weight updating balances the similarity loss and the artifact regulation loss.

15. The computerized method of artifact regulation in deep adversarial model training for image transformation of claim 10, wherein the image transformation is for microscopy image restoration.

16. The computerized method of artifact regulation in deep adversarial model training for image transformation of claim 10, wherein the image transformation is for microscopy image prediction.

17. A computerized method of artifact regulation in bi-directional deep adversarial model training for image transformation, the method comprising the steps of:
- a) inputting a training data, a validation data, a similarity loss function, an artifact regulation loss function and a weight of loss functions and an initial deep model into electronic storage means; and setting a deep model to the initial deep model;
- b) performing one cycle of bi-directional deep adversarial model training by computing means to update the deep model using the training data, the validation data, the similarity loss function, the artifact regulation loss function and the weight to generate similarity loss and artifact regulation loss and an updated deep model;
- c) performing a training evaluation using the similarity loss and the artifact regulation loss to generate a training readiness output selected from a group consisting of (1) weight update, (2) continue and (3) stop;
- d) in response to the training readiness output from step c) being weight update, performing a weight updating to update the weight, setting the deep model to the updated deep model and repeating steps b) through c);
- e) in response to the training readiness output from step c) being continue, setting the deep model to the updated deep model and repeating steps b) through c); and
- f) in response to the training readiness output from step c) being stop, terminating the method and outputting the updated deep model generated in step b).

18. The computerized method of artifact regulation of claim 17, wherein the similarity loss function evaluates bi-directional consistency losses.

19. The computerized method of artifact regulation of claim 17, wherein the artifact regulation loss function evaluates adversarial losses.

20. The computerized method of artifact regulation of claim 17, wherein the training evaluation uses trends of the similarity loss and the artifact regulation loss of the training data and the validation data to generate the training readiness output.

21. The computerized method of artifact regulation of claim 17, wherein the weight updating balances the similarity loss and the artifact regulation loss.

* * * * *